(12) United States Patent
Tanaka et al.

(10) Patent No.: US 9,631,345 B2
(45) Date of Patent: Apr. 25, 2017

(54) WHEEL LOADER AND CONTROL METHOD THEREOF

(71) Applicant: KOMATSU LTD., Tokyo (JP)

(72) Inventors: Yutaka Tanaka, Komatsu (JP); Takeshi Kamimae, Kanazawa (JP); Atsushi Shirao, Komatsu (JP); Satoshi Isejima, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/889,489

(22) PCT Filed: Sep. 16, 2015

(86) PCT No.: PCT/JP2015/076287
§ 371 (c)(1),
(2) Date: Nov. 6, 2015

(87) PCT Pub. No.: WO2016/043222
PCT Pub. Date: Mar. 24, 2016

(65) Prior Publication Data
US 2017/0073933 A1 Mar. 16, 2017

(51) Int. Cl.
*G06F 7/00* (2006.01)
*E02F 9/22* (2006.01)
*E02F 3/34* (2006.01)

(52) U.S. Cl.
CPC .............. *E02F 9/2253* (2013.01); *E02F 3/34* (2013.01)

(58) Field of Classification Search
CPC .................................. E02F 9/2253; E02F 3/34
See application file for complete search history.

(56) References Cited

U.S. PATENT DOCUMENTS

| | | | |
|---|---|---|---|
| 5,297,649 A * | 3/1994 | Yamamoto | E02F 9/2246 172/3 |
| 8,868,306 B1 | 10/2014 | Shiina et al. | |
| 2009/0265065 A1 | 10/2009 | Ikari | |
| 2010/0024412 A1* | 2/2010 | Hyodo | F16H 61/47 60/426 |

(Continued)

FOREIGN PATENT DOCUMENTS

| | | |
|---|---|---|
| JP | 2008-128192 A | 6/2008 |
| JP | 2008-144942 A | 6/2008 |

(Continued)

OTHER PUBLICATIONS

International Search Report for the corresponding internatinoal application No. PCT/JP2015/076287, issued on Dec. 28, 2015.

(Continued)

*Primary Examiner* — David J Hlavka
(74) *Attorney, Agent, or Firm* — Global IP Counselors, LLP

(57) ABSTRACT

A mode selecting unit is configured to generate an operation signal indicating one control mode selected from a plurality of control modes including a predetermined first mode and a second mode in which a traction force is controlled to be smaller than a traction force in the first mode. A controller is configured to obtain the operation signal from the mode selecting unit and control a drivetrain in accordance with the selected control mode. The controller is configured to start controlling the drivetrain in the second mode in starting of a vehicle.

12 Claims, 11 Drawing Sheets

(56) References Cited

U.S. PATENT DOCUMENTS

2013/0261913 A1\* 10/2013 Ishikawa ................. F16H 59/72
  701/62
2014/0138177 A1\* 5/2014 Yoshida .................. E02F 3/325
  180/307
2014/0290236 A1 10/2014 Aizawa et al.

FOREIGN PATENT DOCUMENTS

| | | |
|---|---|---|
| JP | 5412011 B1 | 11/2013 |
| JP | 2014-190235 A | 10/2014 |
| JP | 2015-121161 A | 7/2015 |
| WO | 2007/074608 A1 | 7/2007 |

OTHER PUBLICATIONS

Office Action for the corresponding Japanese application No. 2015-549887, issued on Nov. 1, 2016.

\* cited by examiner

WHEEL LOADER AND CONTROL METHOD THEREOF

CROSS-REFERENCE TO RELATED APPLICATIONS

This application is a U.S. National stage application of International Application No. PCT/JP2015/076287, filed on Sep. 16, 2015.

BACKGROUND

Field of the Invention

The present invention relates to a wheel loader and a control method thereof.

Background Information

Some wheel loaders enable an operator to select one of a plurality of modes as a vehicle control mode. For example, a wheel loader described in Japan Laid-open Patent Application Publication No. 2008-144942 is provided with a traction control switch. The operator is allowed to select a traction control mode by turning on the traction control switch. The operator is allowed to deactivate the traction control mode and select a normal mode by turning off the traction control switch.

The maximum traction force of the vehicle in the traction control mode is reduced lower than that in the normal mode. Therefore, the operator turns on the traction control switch on the road, such as the soft ground, on which slip of tires is likely to occur. As a result of the operation, the traction force is reduced, and slip of the tires can be inhibited. On the other hand, the operator turns off the traction control switch in a normal state. Accordingly, work can be performed with the normal mode in which a large traction force is exerted.

SUMMARY

In the well-known wheel loader, one of the control modes is configured to be selected in accordance with the status of the traction control switch in starting of the vehicle. In other words, when the traction control switch remains turned on in starting of the vehicle, the traction control mode is configured to be selected as the control mode. However, when the traction control switch remains turned off in starting of the vehicle, the normal mode is configured to be selected as the control mode.

In general, every time the vehicle is started, many operators do not switch on the traction control switch. Therefore, when the traction control switch remains turned off in deactivation of the vehicle, controlling of the vehicle is configured to be started with the normal mode in starting of the vehicle. Therefore, an effect of enhancing fuel economy, attributed to the traction control mode, could not have been expected so far.

It is an object of the present invention to enhance fuel economy in a wheel loader.

A wheel loader according to a first aspect includes a travelling wheel, a drivetrain, a work implement, a mode selecting unit and a controller. The drivetrain includes an engine, a power transmission mechanism and a work implement pump. The power transmission mechanism is configured to rotationally drive the travelling wheel by a driving force from the engine. The work implement pump is configured to be driven by the engine. The work implement is configured to be driven by a hydraulic oil discharged from the work implement pump. The mode selecting unit is configured to generate an operation signal indicating one selected from a plurality of control modes including a predetermined first mode and a second mode in which a traction force is controlled to be smaller than a traction force in the first mode. The controller is configured to obtain the operation signal from the mode selecting unit and control the drivetrain in accordance with the selected control mode. The controller is configured to start controlling the drivetrain in the second mode in starting of a vehicle.

In the wheel loader according to the present aspect, even when the first mode is selected, controlling of the drivetrain is configured to be started in the second mode in starting the vehicle next time. The traction force in the second mode is smaller than that in the first mode, and hence, the second mode exerts better fuel economy than the first mode. Therefore, the drivetrain can be controlled in the second mode exerting better fuel economy even when an operator does not perform an operation of restoring the control mode to the second mode in starting of the vehicle. Accordingly, enhancement in fuel economy can be achieved.

A method of controlling a wheel loader according to a second aspect includes the following steps. In a first step, an operation signal is obtained that indicates one selected from a plurality of control modes including a predetermined first mode and a second mode in which a traction force is controlled to be smaller than a traction force in the first mode. In a second step, a drivetrain is controlled in accordance with the selected control mode. In a third step, controlling of the drivetrain is started in the second mode in starting of a vehicle.

In the method of controlling a wheel loader according to the present aspect, even when the first mode is selected, controlling of the drivetrain is started in the second mode in starting the vehicle next time. The traction force in the second mode is smaller than that in the first mode, and hence, the second mode exerts better fuel economy than the first mode. Therefore, the drivetrain can be controlled in the second mode exerting better fuel economy even when an operator does not perform an operation of restoring the control mode to the second mode in starting of the vehicle. Accordingly, enhancement in fuel economy can be achieved.

According to the present invention, enhancement in fuel economy can be achieved in a wheel loader.

DESCRIPTION OF EXEMPLARY EMBODIMENTS

Figure 1:
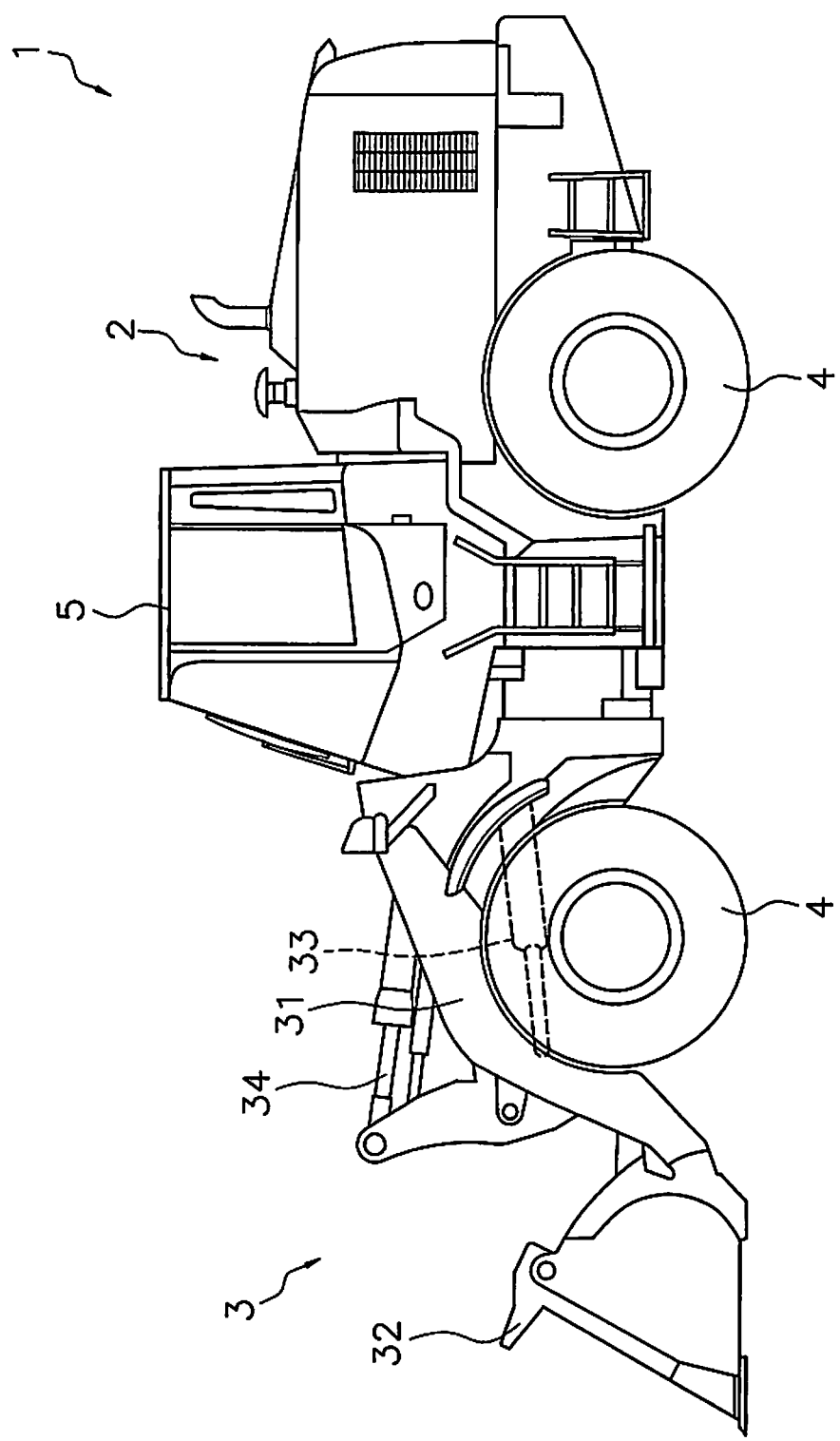
FIG. 1 is a side view of a wheel loader according to an exemplary embodiment.

A wheel loader according to an exemplary embodiment will be hereinafter explained with drawings. FIG. 1 is a side view of a wheel loader 1 according to the exemplary embodiment. The wheel loader 1 includes a vehicle body 2, a work implement 3, a plurality of travelling wheels 4 and a cab 5. The work implement 3 is mounted to the front part of the vehicle body 2. The work implement 3 includes a boom 31, a bucket 32, a lift cylinder 33 and a bucket cylinder 34. The boom 31 is rotatably attached to the vehicle body 2. The boom 31 is configured to be driven by the lift cylinder 33. The bucket 32 is rotatably attached to the tip of the boom 31. The bucket 32 is configured to be dumped and tilted by the bucket cylinder 34. The cab 5 is mounted onto the vehicle body 2.

Figure 2:
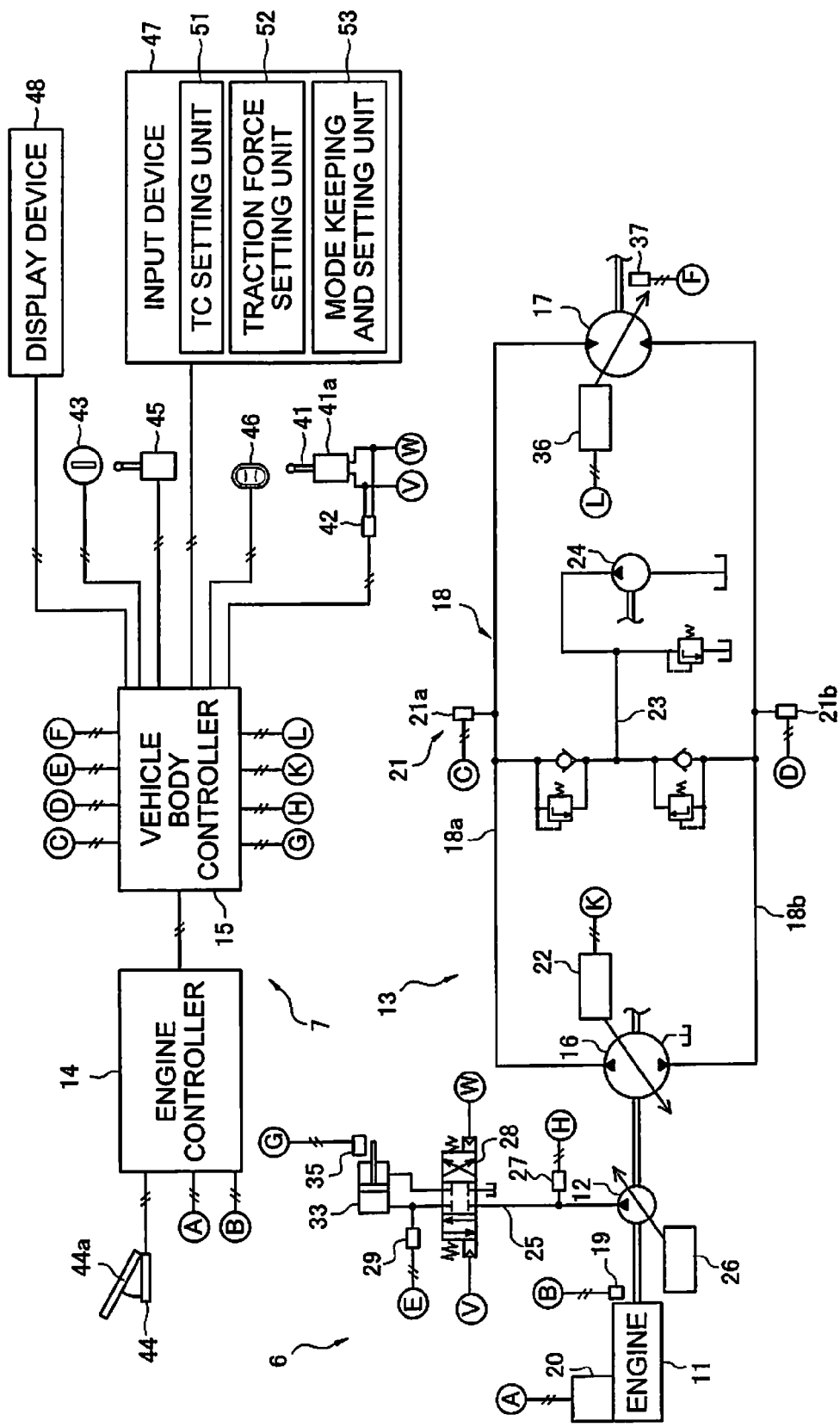
FIG. 2 is a schematic diagram of a configuration of a drivetrain and a control system of the wheel loader.

FIG. 2 is a block diagram showing a configuration of a drivetrain 6 and a control system 7, both of which are installed in the wheel loader 1. The drivetrain 6 mainly includes an engine 11, a work implement pump 12 and a power transmission mechanism 13. On the other hand, the control system 7 includes an engine controller 14 and a vehicle body controller 15.

The power transmission mechanism 13 is configured to rotationally drive the travelling wheels 4 by a driving force from the engine 11. The power transmission mechanism 13 is a so-called HST (Hydro Static Transmission). The power transmission mechanism 13 includes a travelling pump 16, a travelling motor 17 and a hydraulic drive circuit 18. The power transmission mechanism 13 is configured to discharge hydraulic oil when the travelling pump 16 is driven by the engine 11. The travelling motor 17 is driven by the hydraulic oil discharged from the travelling pump 16. Then, the travelling motor 17 rotationally drives the aforementioned travelling wheels 4, and thus, the wheel loader 1 is caused to travel.

The engine 11 is a diesel engine, and an output torque generated by the engine 11 is transmitted to the work implement pump 12, the travelling pump 16 and so forth. The drivetrain 6 is provided with an engine rotational speed sensor 19 configured to detect an actual rotational speed of the engine 11. Additionally, a fuel injection device 20 is connected to the engine 11. The engine controller 14 is configured to control the fuel injection device 20 in accordance with a set throttle opening degree so as to control the output torque of the engine 11 (hereinafter referred to as "engine torque") and the rotational speed of the engine 11.

When driven by the engine 11, the travelling pump 16 is configured to discharge the hydraulic oil. The travelling pump 16 is a variable displacement hydraulic pump. The hydraulic oil discharged from the travelling pump 16 is transmitted to the travelling motor 17 through the hydraulic drive circuit 18. Specifically, the hydraulic drive circuit 18 includes a first drive circuit 18a and a second drive circuit 18b. The travelling motor 17 is configured to be driven in one direction (e.g., a forward moving direction) when the hydraulic oil is supplied thereto from the travelling pump 16 through the first drive circuit 18a. The travelling motor 17 is configured to be driven in the other direction (e.g., a rearward moving direction) when the hydraulic oil is supplied thereto from the travelling pump 16 through the second drive circuit 18b.

The hydraulic drive circuit 18 is provided with a drive circuit pressure detecting unit 21. The drive circuit pressure detecting unit 21 is configured to detect the pressure of the hydraulic oil (hereinafter referred to as "drive circuit pressure") to be supplied to the travelling motor 17 through either the first drive circuit 18a or the second drive circuit 18b. Specifically, the drive circuit pressure detecting unit 21 includes a first drive circuit pressure sensor 21a and a second drive circuit pressure sensor 21b. The first drive circuit pressure sensor 21a is configured to detect the hydraulic pressure in the first drive circuit 18a. The second drive circuit pressure sensor 21b is configured to detect the hydraulic pressure in the second drive circuit 18b. The first drive circuit pressure sensor 21a and the second drive circuit pressure sensor 21b are configured to transmit detection signals to the vehicle body controller 15.

A pump displacement controlling unit 22 is connected to the travelling pump 16. The pump displacement controlling unit 22 includes, for instance, a servo cylinder, an electromagnetic control valve for controlling the hydraulic oil to be supplied to the servo cylinder, and so forth. The pump displacement controlling unit 22 is controlled based on a control signal transmitted thereto from the vehicle body controller 15. The pump displacement controlling unit 22 is configured to change the tilt angle of the travelling pump 16 to change the displacement of the travelling pump 16. Additionally, the pump displacement controlling unit 22 is configured to change the discharge direction of the travelling pump 16.

A charge pump 24 is connected to the hydraulic drive circuit 18 through a charge circuit 23. The charge pump 24 is a pump configured to be driven by the engine 11 to supply the hydraulic oil to the hydraulic drive circuit 18. When the hydraulic pressure in the first drive circuit 18a becomes lower than that in the charge circuit 23, the hydraulic oil is supplied from the charge pump 24 to the first drive circuit 18a through the charge circuit 23. When the hydraulic pressure in the second drive circuit 18b becomes lower than that in the charge circuit 23, the hydraulic oil is supplied from the charge pump 24 to the second drive circuit 18b through the charge circuit 23.

When the hydraulic pressure in the hydraulic drive circuit 18 becomes higher than a predetermined relief pressure, the hydraulic drive circuit 18 is configured to be connected to a hydraulic oil tank through the charge circuit 23. Accordingly, the hydraulic pressure in the hydraulic drive circuit 18 is prevented from exceeding the relief pressure.

The work implement pump 12 is configured to be driven by the engine 11. The hydraulic oil discharged from the work implement pump 12 is supplied to the lift cylinder 33 through a work implement hydraulic circuit 25. Accordingly, the work implement 3 is configured to be driven.

A pump displacement controlling unit 26 is connected to the work implement pump 12. The pump displacement controlling unit 26 includes, for instance, a servo cylinder, an electromagnetic control valve for controlling the hydraulic oil to be supplied to the servo cylinder, and so forth. The pump displacement controlling unit 26 is controlled based on a control signal transmitted thereto from the vehicle body controller 15. The pump displacement controlling unit 26 is configured to change the tilt angle of the work implement pump 12 to change the displacement of the work implement pump 12.

The discharge pressure of the work implement pump 12 is detected by a discharge pressure sensor 27. The discharge pressure sensor 27 is configured to transmit a detection signal to the vehicle body controller 15. The work implement hydraulic circuit 25 is provided with a work implement control valve 28. The work implement control valve 28 is configured to be driven in accordance with the operating amount of a work implement operating member 41. The work implement control valve 28 is configured to control the flow rate of the hydraulic oil to be supplied to the lift cylinder 33 in accordance with a pilot pressure (hereinafter referred to as "PPC pressure") to be applied to a pilot port.

The PPC pressure to be applied to the pilot port of the work implement control valve 28 is controlled by a pilot valve 41a of the work implement operating member 41. The pilot valve 41a is configured to apply the PPC pressure to the pilot port of the work implement control valve 28 in accordance with the operating amount of the work implement operating member 41. Accordingly, the lift cylinder 33 is configured to be controlled in accordance with the operating amount of the work implement operating member 41. The PPC pressure to be applied to the pilot port of the work implement control valve 28 is detected by a PPC pressure sensor 42. On the other hand, the pressure of the hydraulic oil to be supplied to the lift cylinder 33 (hereinafter referred to as "cylinder pressure") is detected by a cylinder pressure sensor 29. The PPC pressure sensor 42 and the cylinder pressure sensor 29 are configured to transmit detection signals to the vehicle body controller 15.

The lift cylinder 33 is provided with a boom angle detecting unit 35. The boom angle detecting unit 35 is configured to detect a boom angle to be described. The boom angle detecting unit 35 is a sensor for detecting the rotational angle of the boom 31. The boom angle detecting unit 35 is configured to transmit a detection signal to the vehicle body controller 15. It should be noted that similarly to the lift cylinder 33, the bucket cylinder 34 is also configured to be controlled by a control valve, but is not shown in FIG. 2.

The travelling motor 17 is a variable displacement hydraulic motor. The travelling motor 17 is driven by the hydraulic oil discharged from the travelling pump 16 to generate a driving force for travelling. The travelling motor 17 is provided with a motor displacement controlling unit 36. The motor displacement controlling unit 36 includes, for instance, a servo cylinder and an electromagnetic control valve for controlling the hydraulic oil to be supplied to the servo cylinder. The motor displacement controlling unit 36 is controlled based on a control signal transmitted thereto from the vehicle body controller 15. The motor displacement controlling unit 36 is configured to change the tilt angle of the travelling motor 17 to change the displacement of the travelling motor 17.

The drivetrain 6 is provided with a vehicle speed sensor 37. The vehicle speed sensor 37 is configured to detect a vehicle speed. The vehicle speed sensor 37 is configured to transmit a vehicle speed signal to the vehicle body controller 15. The vehicle speed sensor 37 is configured to detect the vehicle speed by, for instance, detecting the rotational speed of a driveshaft of the travelling wheels 4.

The wheel loader 1 includes a start switch 43, an accelerator operating member 44, a forward/rearward movement switch operating member 45, a mode selecting unit 46, an input device 47 and a display device 48. The start switch 43, the accelerator operating member 44, the forward/rearward movement switch operating member 45, the mode selecting unit 46 and the input device 47 are disposed inside the cab 5.

The start switch 43 is a switch for starting the engine 11. For example, the start switch 43 is a key switch. When an operator turns on the start switch 43, the engine 11 is configured to be started. Additionally, when the operator turns on the start switch 43, the control system 7 of the wheel loader 1 is configured to be started up. When the operator turns off the start switch 43, the engine 11 is configured to be stopped. Additionally, when the operator turns off the start switch 43, the control system 7 of the wheel loader 1 is configured to be shut down. The start switch 43 is configured to generate an operation signal indicating an operation of the start switch 43 and transmit the operation signal to the vehicle body controller 15.

The accelerator operating member 44 is a member for enabling the operator to set a throttle opening degree. The accelerator operating member 44 is an accelerator pedal, for instance, and is operated by the operator. The accelerator operating member 44 is connected to an accelerator operating amount sensor 44a. The accelerator operating amount sensor 44a is implemented by a potentiometer and so forth. The accelerator operating amount sensor 44a is configured to generate an opening degree signal indicating the accelerator operating amount of the accelerator operating member 44 and transmit the opening degree signal to the engine controller 14. The operator is allowed to control the rotational speed of the engine 11 by regulating the accelerator operating amount.

The forward/rearward movement switch operating member 45 is operated by the operator and is switched among a forward moving position, a rearward moving position and a neutral position. The forward/rearward movement switch operating member 45 is configured to transmit an operation signal indicating the position of the forward/rearward movement switch operating member 45 to the vehicle body controller 15. The operator is allowed to switch between forward movement and rearward movement of the wheel loader 1 by operating the forward/rearward movement switch operating member 45.

The mode selecting unit 46 is operated by the operator in order to select one of control modes related to traction control to be described. The mode selecting unit 46 is configured to generate an operation signal indicating the position selected by the mode selecting unit 46 and transmit the operation signal to the vehicle body controller 15.

The input device 47 is operated by the operator to perform a variety of settings in the traction control to be described. The input device 47 is, for instance, a touch panel device. The input device 47 is configured to generate an operation signal indicating the content of setting and transmit the operation signal to the vehicle body controller 15.

The display device 48 is configured to display information related to the wheel loader 1. The display device 48 is configured to display, for instance, the engine rotational speed, the amount of remaining fuel, the temperature of oil and so forth. It should be noted that the input device 47 and the display device 48 may be integrally provided.

The engine controller 14 is an electronic control unit including an arithmetic-and-logic unit such as a CPU and a variety of memories. The engine controller 14 is programmed to control the engine 11. The engine controller 14 is configured to control the engine 11 to obtain a target rotational speed in accordance with the set throttle opening degree.

Figure 3:
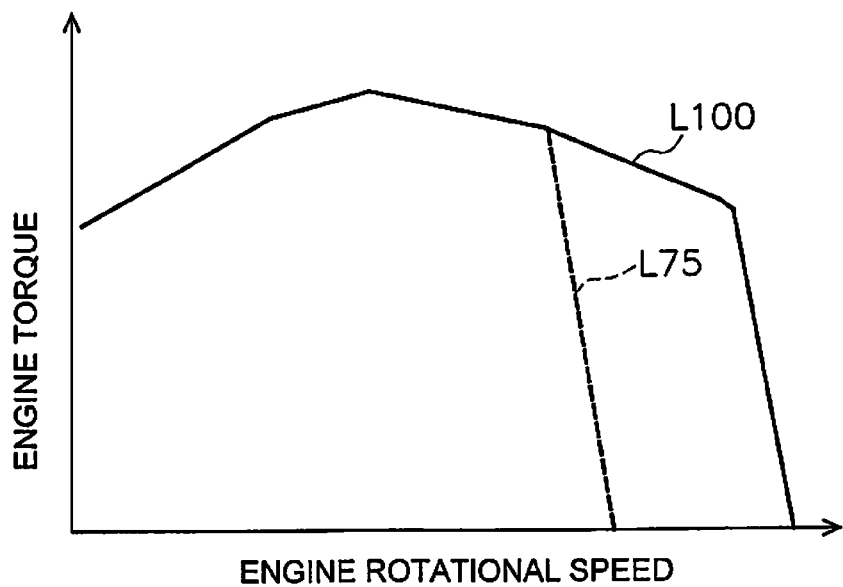
FIG. 3 is a chart showing examples of engine output torque curves.

FIG. 3 shows engine torque curves. Each engine torque curve indicates a relation between the rotational speed of the engine 11 and the magnitude of the maximum engine torque that can be outputted from the engine 11 in each rotational speed. In FIG. 3, a solid line L100 indicates an engine torque curve where the accelerator operating amount is 100% in a state that a control of setting the upper limit of the throttle opening degree to be described is not being performed (hereinafter referred to as "normal state").

The engine torque curve L100 corresponds to, for instance, the rated or maximum power output of the engine 11. It should be noted that an accelerator operating amount of 100% means a state that the accelerator operating member 44 is maximally operated. On the other hand, a broken line L75 indicates an engine torque curve where the accelerator operating amount is 75% in the normal state. The engine controller 14 is configured to control the output of the engine 11 such that the engine torque becomes lower than or equal to the engine torque curve. The output of the engine ills controlled by, for instance, controlling the upper limit of the amount of fuel to be injected into the engine 11.

The vehicle body controller 15 is an electronic controlling unit including an arithmetic-and-logic unit, such as a CPU, and a variety of memories. The vehicle body controller 15 is configured to establish communication with the engine controller 14 to obtain information, such as the engine rotational speed. The vehicle body controller 15 is programmed to control the displacement of the work implement pump 12. The vehicle body controller 15 is configured to control the displacement of the work implement pump 12 based on the operating amount of the work implement operating member 41 and so forth.

The vehicle body controller 15 is programmed to control the displacement of the travelling pump 16 and that of the travelling motor 17. The vehicle body controller 15 is configured to control the displacement of the travelling pump 16 and that of the travelling motor 17 by electronically controlling the pump displacement controlling unit 22 and the motor displacement controlling unit 36 based on the output signals from the respective detecting units.

Figure 4:
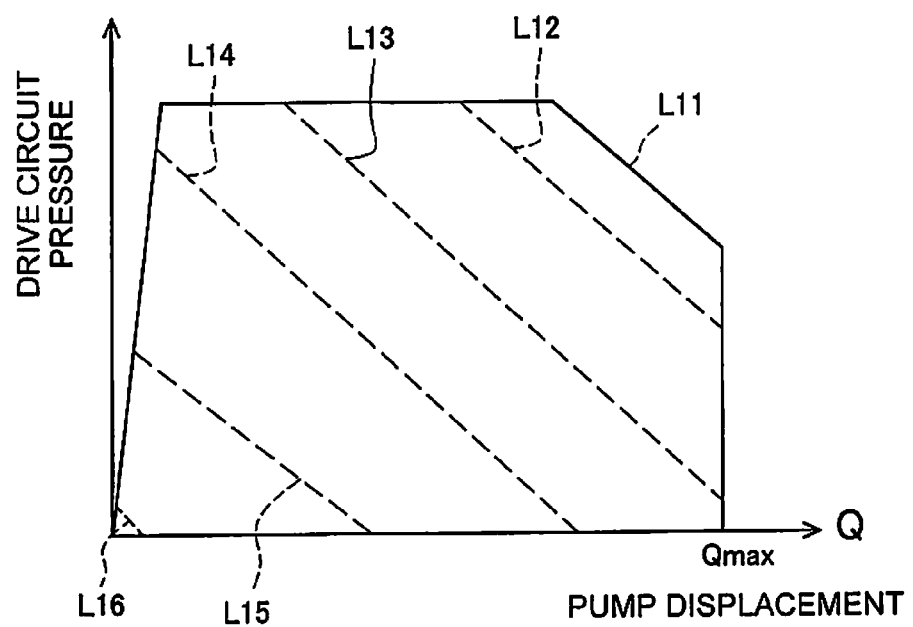
FIG. 4 is a chart showing examples of pump displacement-drive circuit pressure characteristics.

Specifically, the vehicle body controller 15 is configured to output a command signal to the pump displacement controlling unit 22 based on the engine rotational speed detected by the engine rotational speed sensor 19. Accordingly, a relation between the pump displacement and the drive circuit pressure is defined. FIG. 4 shows an example of pump displacement-drive circuit pressure characteristics. The pump displacement-drive circuit pressure characteristics indicate the relation between the pump displacement and the drive circuit pressure.

L11 to L16 in FIG. 4 are lines for indicating the pump displacement-drive circuit pressure characteristics to be changed in accordance with the engine rotational speed. The pump displacement-drive circuit pressure characteristics are configured to be changed among L11 to L16 when the vehicle body controller 15 controls the pump displacement controlling unit 22 based on the engine rotational speed. Accordingly, the pump displacement is controlled in correspondence with the engine rotational speed and the drive circuit pressure.

The vehicle body controller 15 is configured to process an output signal from the engine rotational speed sensor 19 and that from the drive circuit pressure detecting unit 21 and output a command signal regarding the motor displacement to the motor displacement controlling unit 36. The vehicle body controller 15 is herein configured to refer to the motor displacement-drive circuit pressure characteristics stored therein and set the motor displacement based on the value of the engine rotational speed and the value of the drive circuit pressure. The vehicle body controller 15 is configured to output to the motor displacement controlling unit 36 a command for changing the tilt angle in correspondence with the set motor displacement.

Figure 5:
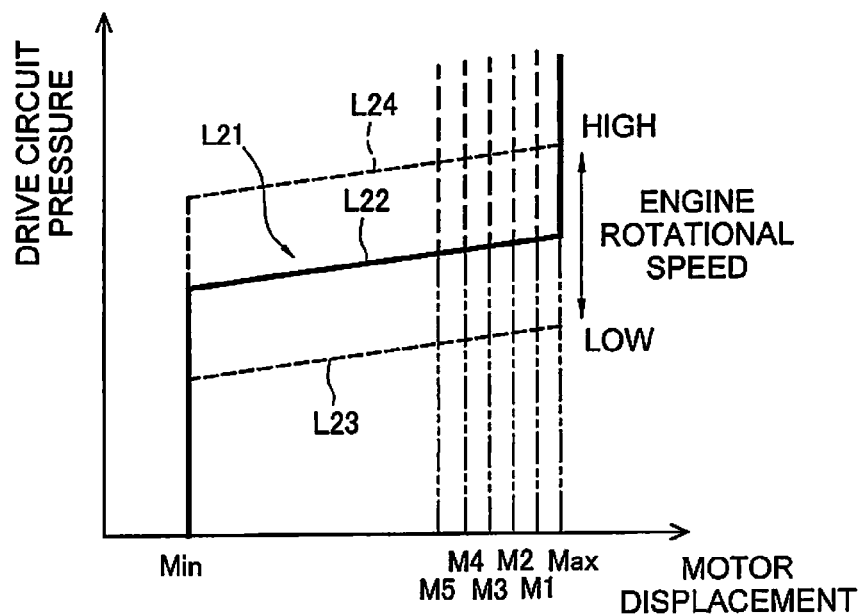
FIG. 5 is a chart showing examples of motor displacement-drive circuit pressure characteristics.

FIG. 5 shows an example of motor displacement-drive circuit pressure characteristics. A solid line L21 in the drawing is a line defining the motor displacement with respect to the drive circuit pressure in a state that the engine rotational speed has a given value. The motor displacement herein corresponds to the tilt angle of the travelling motor 17.

When the drive circuit pressure is less than or equal to a predetermined value, the motor displacement is minimized (Min). The motor displacement then gradually increases with increase in the drive circuit pressure (a slope part L22 of the solid line). Then, the motor displacement is maximized (Max), and thereafter, is kept at the maximum displacement Max even when the drive circuit pressure increases. The slope part L22 defines a target pressure of the drive circuit pressure. In short, the vehicle body controller 15 is configured to increase the displacement of the travelling hydraulic motor when the drive circuit pressure becomes higher than the target pressure. On the other hand, the vehicle body controller 15 is configured to reduce the displacement of the travelling hydraulic motor when the drive circuit pressure becomes lower than the target pressure.

The target pressure is defined in accordance with the engine rotational speed. In other words, the slope part L22 shown in FIG. 5 is set to shift up and down in accordance with increase and decrease in engine rotational speed. Specifically, when the engine rotational speed is low, the slope part L22 is controlled such that the motor displacement begins to increase when the drive circuit pressure is as low as possible and then reaches the maximum displacement when the drive circuit pressure is similarly as low as possible (see a lope part L23 of a lower broken line in FIG. 5). Contrarily, when the engine rotational speed is high, the slope part L22 is controlled such that the minimum displacement Min is kept until the drive circuit pressure increases as much as possible and then reaches the maximum displacement Max when the drive circuit pressure similarly increases as much as possible (see a slope part L24 of an upper broken line in FIG. 5).

Figure 6:
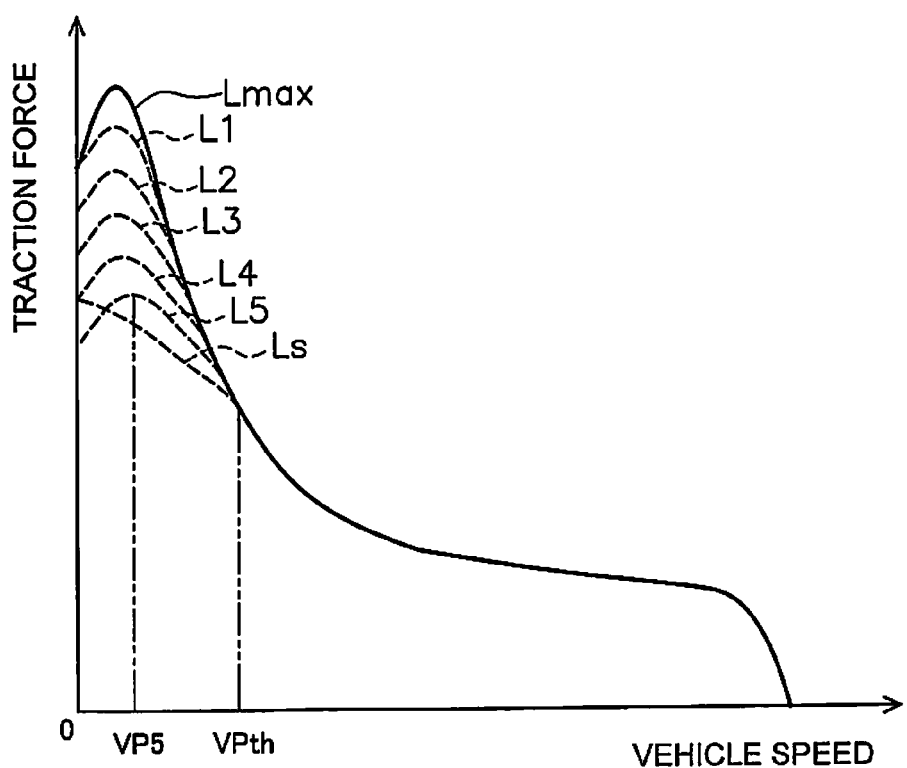
FIG. 6 is a chart showing examples of vehicle speed-traction force curves of the wheel loader.

Accordingly, as shown in FIG. 6, in the wheel loader 1, the vehicle speed and the traction force continuously vary and gear shifting is automatically enabled from the vehicle speed 0 to the maximum vehicle speed without performing a gearshift operation. It should be noted that vehicle speed-traction force characteristics Lmax, L1 to L5, and Ls shown in FIG. 6 are respectively vehicle speed-traction force characteristics in a state that the accelerator is fully operated.

Figure 7:
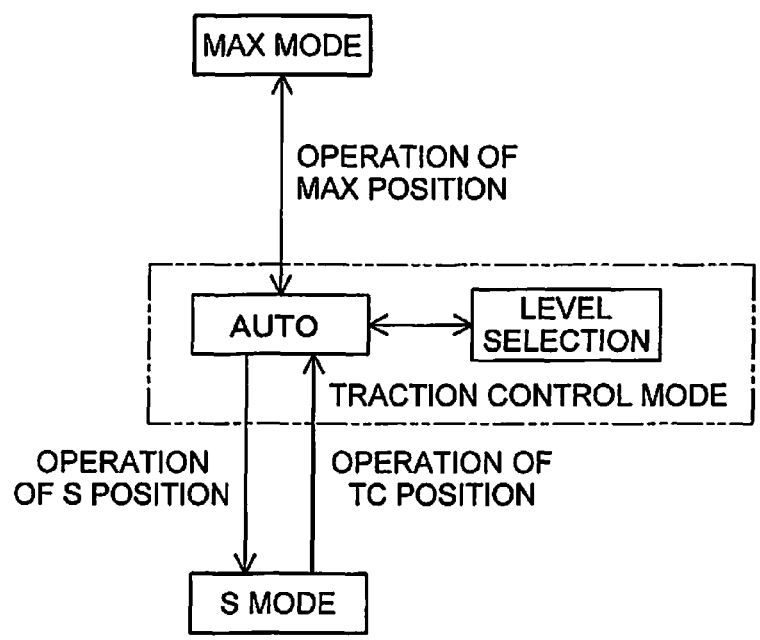
FIG. 7 is a diagram showing shifting among control modes.

In the wheel loader 1 according to the present exemplary embodiment, the operator is allowed to select one of the control modes related to controlling of the traction force with use of the mode selecting unit 46. FIG. 7 shows the control modes selectable with use of the mode selecting unit 46. As shown in FIG. 7, the operator is allowed to select one of a Max mode (first mode), a traction control mode (second mode) and an S mode (third mode) with use of the mode selecting unit 46. Information, indicating the control mode selected with use of the mode selecting unit 46, is displayed on the aforementioned display device 48.

In the MAX mode, the traction force of the vehicle is controlled to follow vehicle speed-traction force characteristics Lmax shown in FIG. 6. The maximum traction force in the MAX mode is the largest among those in all the control modes. In other words, the maximum traction force in the MAX mode is the maximum traction force usable in the vehicle. Therefore, the MAX mode is not better than the other control modes from the perspective of fuel economy, but enables work with a high power.

In the traction control mode, the maximum traction force Lmax becomes smaller than that in the Max mode. Accordingly, occurrence of slip of the travelling wheels 4 can be inhibited. The traction force in the traction control mode is smaller than that in the MAX mode in a predetermined low speed range. The predetermined low speed range is a range that the vehicle speed is greater than or equal to 0 and less than a vehicle speed VPth. The predetermined low speed range is a speed range to be used in, for instance, work such as digging or loading. It should be noted that the speed VPth may vary in accordance with levels of the traction force.

In middle and high speed ranges that the vehicle speed is the speed VPth or greater, the traction force in the traction control mode is equal to that in the MAX mode. It should be noted that in the middle and high speed ranges that the vehicle speed is the speed VPth or greater, the traction force in the traction control mode may not be exactly equal to that in the MAX mode, and may be slightly different from that in the MAX mode.

Additionally, as shown in FIG. 5, the upper limit of the motor displacement in the traction control mode is set to be lower than that in the MAX mode. Therefore, the pump discharge amount in the traction control mode at a given vehicle speed may be smaller than that in the MAX mode at the given vehicle speed. Therefore, the engine rotational speed at a given vehicle speed in the traction control mode becomes smaller than that at the given vehicle speed in the MAX mode. Accordingly, fuel economy can be more enhanced in the traction control mode than in the MAX mode. Additionally, although described below, enhancement in fuel economy can be also achieved by controlling the displacement of the travelling pump 16.

The traction control mode has a level selecting mode and an automatic mode. As shown in FIG. 2, the input device 47 includes a traction control setting unit 51 (hereinafter referred to as "TC setting unit 51"). The TC setting unit 51 is configured to set either the level selecting mode or the automatic mode as the control mode in the traction control mode. In other words, the operator is allowed to preliminarily set either the level selecting mode or the automatic mode as the control mode to be performed in selecting the traction control mode with use of the mode selecting unit 46.

Figure 8:
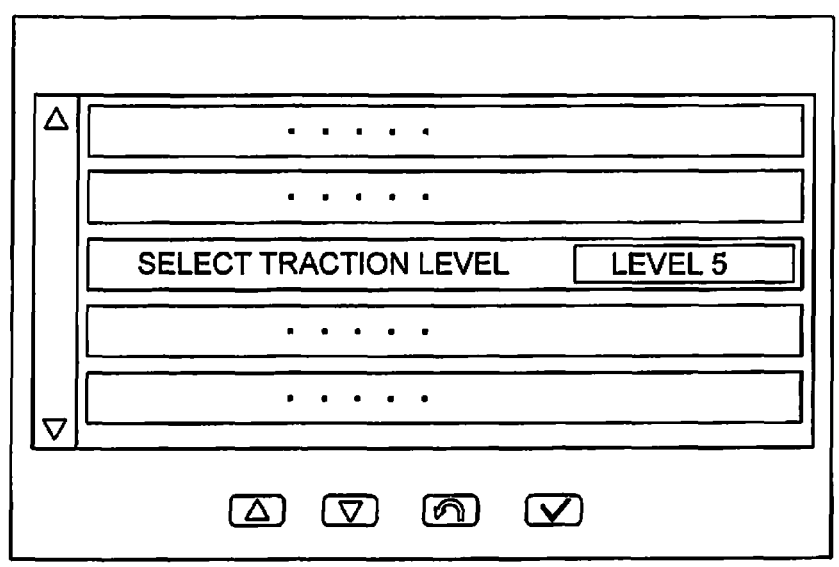
FIG. 8 is a diagram showing an operation screen of a traction force setting unit.

In the level selecting mode, the maximum traction force is controlled to have the magnitude of a preliminarily set one of the maximum traction forces of a plurality of levels. As shown in FIG. 2, the input device 47 includes a traction force setting unit 52 for setting the magnitude of the maximum traction force. In the level selecting mode, the vehicle body controller 15 is configured to assign the magnitude set by the traction force setting unit 52 to the maximum traction force. FIG. 8 is an operation screen of the traction force setting unit 52 configured to be displayed on the input device 47. For example, the magnitude of the maximum traction force can be set in five levels composed of first to fifth levels by the traction force setting unit 52.

When the first level is set, the vehicle body controller 15 is configured to set the upper limit of the motor displacement to be M1 that is smaller than Max as shown in FIG. 5. Accordingly, the traction force of the vehicle is controlled to follow the vehicle speed-traction force characteristic L1 shown in FIG. 6. Likewise, when one of the second to fifth levels is set, the vehicle body controller 15 is configured to set the upper limit of the motor displacement to be the corresponding one of M2 to M5 shown in FIG. 5. Accordingly, the traction force of the vehicle is controlled to follow corresponding one of the vehicle speed-traction force characteristics L2 to L5 shown in FIG. 6.

In the automatic mode, the vehicle body controller 15 is configured to determine which of work phases the vehicle is in and is configured to control the maximum traction force in accordance with the determined work phase. For example, when the following determination conditions (a1) to (a4) are all satisfied, the vehicle body controller 15 is configured to determine that the vehicle is in a phase that slip is likely to occur during digging and is configured to reduce the maximum traction force:

(a1) drive circuit pressure>predetermined pressure threshold p1;
(a2) vehicle speed<predetermined speed threshold v1;
(a3) boom angle<predetermined angular threshold d1; and
(a4) cylinder pressure>predetermined pressure threshold p2.

The condition (a1) indicates that the magnitude of load acting on the travelling motor 17 is large. The condition (a2) indicates that the vehicle stops or travels at an extremely low speed. The condition (a3) indicates that the position of the boom 31 is low. The condition (a4) indicates that the magnitude of load acting on the work implement 3 is large. When the conditions (a1) and (a2) are satisfied, this indicates a state that the vehicle tries to travel by driving the travelling motor 17 but can hardly move. On the other hand, when the conditions (a3) and (a4) are satisfied, this indicates that a work by the work implement 3 is ongoing while the boom 31 is disposed in a low position, i.e., that digging is ongoing.

In the situation as described above, the vehicle body controller 15 is configured to reduce the upper limit of the displacement of the travelling motor 17 to automatically reduce the maximum traction force. Alternatively, the vehicle body controller 15 may be configured to reduce the upper limit of the throttle opening degree. In other words, the vehicle body controller 15 may be configured to lower the throttle opening degree than that set by an operation of the accelerator operating member 44 to reduce the traction force.

Moreover, in the automatic mode, when the following determination conditions (b1) to (b3) are all satisfied, the vehicle body controller 15 is configured to determine that the vehicle is in a phase of travelling without using the work implement 3:

(b1) boom angle<predetermined angular threshold 42;
(b2) cylinder pressure<predetermined pressure threshold p3; and
(b3) PPC pressure<predetermined pressure threshold p4.

The condition (b1) indicates that the position of the boom 31 is low. The condition (b2) indicates that the magnitude of load acting on the boom 31 is small. The condition (b3) indicates that the work implement operating member 41 is not being operated completely or hardly at all.

Figure 9:
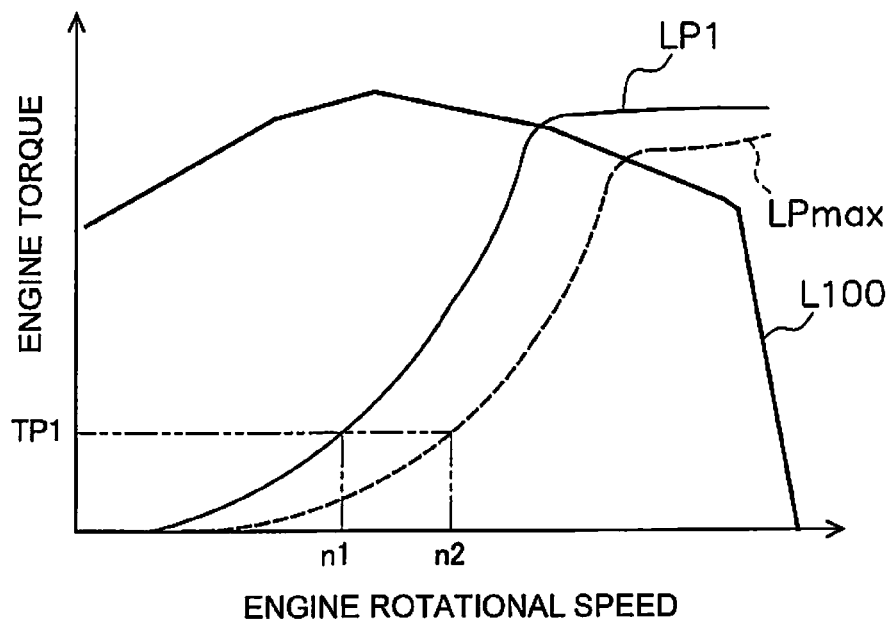
FIG. 9 is a chart showing an absorbed torque curve of a travelling pump in an automatic mode.

When the determination conditions (b1) to (b3) are satisfied, the vehicle body controller 15 is configured to increase the displacement of the travelling pump 16 to change an absorbed torque curve of the travelling pump 16 from LPmax to LP1 as shown in FIG. 9. LPmax indicates the absorbed torque of the travelling pump 16 in the MAX mode.

As shown in FIG. 9, even when an absorbed torque TP1 is commonly considered for both of the absorbed torque curves LP1 and LPmax, an engine rotational speed n1 on the absorbed torque curve LP1 is smaller than an engine rotational speed n2 on the absorbed torque curve LPmax. Therefore, even when the engine rotational speed on the absorbed torque curve LP1 is lower than that on the absorbed torque curve LPmax, the traction force obtainable on the absorbed torque curve LP1 is equivalent to that obtainable on the absorbed torque curve LPmax. Accordingly, the vehicle is capable of travelling at an engine rotational speed lower than that in the MAX mode, and hence, further enhancement in fuel economy can be achieved.

Even when the automatic mode is selected, the vehicle body controller 15 may be configured to control the drivetrain 6 in the MAX mode when it is determined that the vehicle is in a work phase of "scooping-up". The term "scooping-up" means a work of loading a burden into the bucket 32 and simultaneously lifting up the loaded burden by elevating the boom 31. When the aforementioned digging related conditions (a1), (a2) and (a4) are satisfied and simultaneously the boom angle is larger than a predetermined angular threshold, the vehicle body controller 15 is configured to determine that the vehicle is in the work phase of "scooping-up".

In the S mode, the traction force of the vehicle is controlled to follow the vehicle speed-traction force characteristic Ls shown in FIG. 6. In the vehicle speed-traction force characteristic Ls of the S mode, the traction force where the vehicle speed is VP5 is smaller than the maximum traction force in the traction control mode. The vehicle speed VP5 is a speed at which the traction force is maximized in the vehicle speed-traction force characteristic L5 of the traction control mode.

Figure 10:
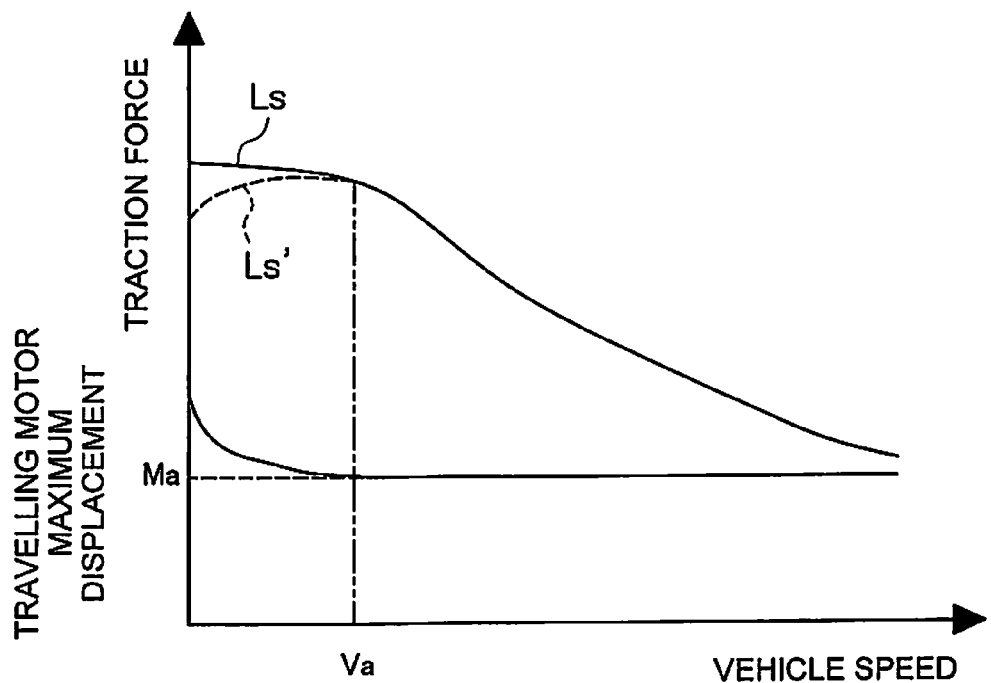
FIG. 10 is a chart showing variation in displacement of a travelling motor in an S mode.

In the S mode, the vehicle body controller 15 is configured to perform a control of increasing the maximum displacement of the travelling motor 17 with a decrease in vehicle speed in a low speed range in which the vehicle speed is less than or equal to a predetermined threshold. For example, as shown in FIG. 10, it is assumed that the maximum displacement of the travelling motor 17 is set constant at Ma when the vehicle speed is greater than or equal to a predetermined threshold Va. In the S mode, the maximum displacement of the travelling motor 17 is increased with a decrease in vehicle speed and is also set to be Ma or greater in a vehicle speed range of greater than or equal to 0 and less than or equal to the threshold Va. It should be noted that the threshold Va is a value of the vehicle speed approximated to a speed such as the aforementioned speed VP5 at which the traction force is maximized.

If it is supposed that the maximum displacement of the travelling motor 17 is constant at Ma even in the vehicle speed range of greater than or equal to 0 and less than or equal to the threshold Va, then the traction force decreases with decrease in vehicle speed in the vehicle speed range of less than or equal to the threshold Va as depicted with Ls' in FIG. 10.

Compared to this, when the maximum displacement of the travelling motor 17 is increased with a decrease in vehicle speed, the traction force increases with a decrease in vehicle speed even in the vehicle speed range of greater than or equal to 0 and less than or equal to the threshold Va as depicted with Ls in FIG. 10. Therefore, a reduction in traction force can be inhibited in the vehicle speed range of greater than or equal to 0 and less than or equal to the threshold Va. Thus, in the S mode, a reduction in traction force can be inhibited in low speed travelling. Accordingly, occurrence of slip can be inhibited in a situation, such as on a snowy road, that the travelling wheels 4 are likely to slip.

Moreover, as shown in FIG. 6, the vehicle speed-traction force characteristic Ls, roughly monotonically decreasing, can be obtained by controlling the displacement of the travelling pump 16 such that the traction force decreases in the low speed range. In the vehicle speed-traction force characteristic Ls, the traction force is maximized when the speed is zero or close to zero. The speed close to zero is, for instance, around 1 km/h. With the vehicle speed-traction force characteristic Ls described above, occurrence of slip can be inhibited immediately after moving. Accordingly, an effect of inhibiting slip can be further enhanced in a situation, such as on a snowy road, that the travelling wheels 4 are likely to slip. It should be noted that the displacement of the travelling pump 16 may be controlled by electronically controlling the travelling pump 16. Alternatively, the displacement of the travelling pump 16 may be controlled by limiting the upper limit of the throttle opening degree of the travelling pump 16.

Figure 11:
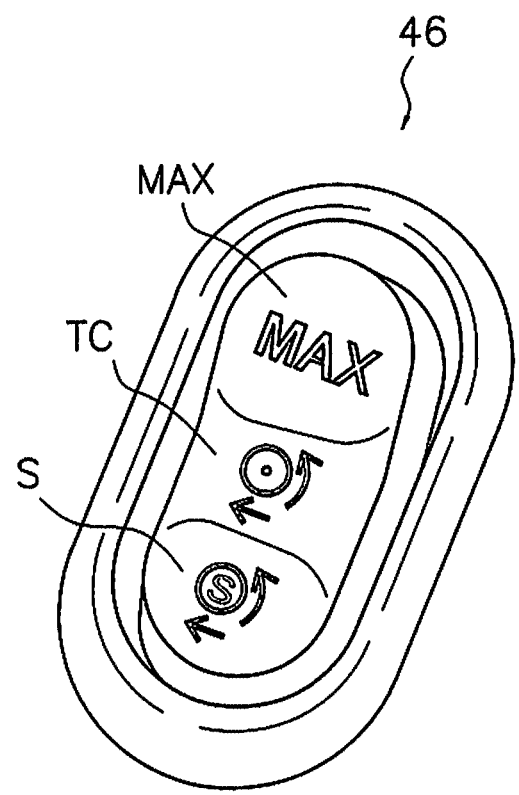
FIG. 11 is a perspective view of a mode selecting unit.

Next, a control of switching among the aforementioned control modes will be explained. FIG. 11 is a perspective view of the mode selecting unit 46. The mode selecting unit 46 is a switch that is settable to three positions. When described in detail, the mode selecting unit 46 can be set in a position for selecting the MAX mode (hereinafter referred to as "MAX position"), a position for selecting the traction control mode (hereinafter referred to as "TC position") and a position for selecting the S mode (hereinafter referred to as "S position"). The mode selecting unit 46 is configured to be pivotable from the TC position to the MAX position and to the S position.

Figure 12A:
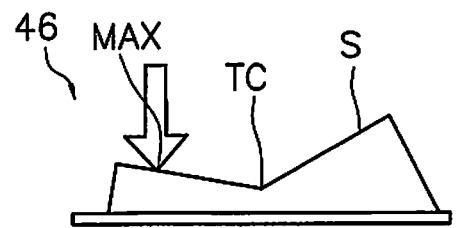
FIGS. 12A, 12B and 12C are diagrams showing motions of the mode selecting unit.
Figure 12B:
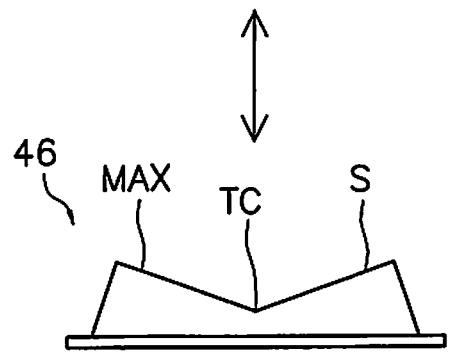

The mode selecting unit 46 functions as a momentary action switch in the MAX position and the TC position. In other words, as depicted with an arrow in FIG. 12(A), the position selected by the mode selecting unit 46 is kept in the MAX position while the operator is pressing the MAX position. However, when the MAX position is not being pressed by the operator, the position selected by the mode selecting unit 46 is automatically restored to the TC position from the MAX position as shown in FIG. 12B.

Figure 12C:
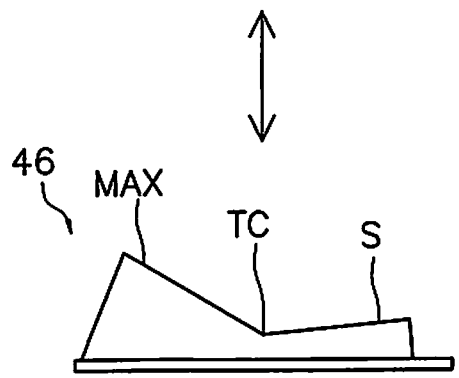

The mode selecting unit 46 functions as an alternate action switch in the S position and the TC position. In other words, when the S position is pressed by the operator, the position selected by the mode selecting unit 46 is kept in the S position as shown in FIG. 12C even when the S position is not being pressed thereafter. Additionally, when the TC position is pressed by the operator, the position selected by the mode selecting unit 46 is kept in the TC position as shown in FIG. 12B even when the TC position is not being pressed thereafter. Thus, the position selected by the mode selecting unit 46 is selectively kept in either the TC position or the S position.

When the position selected by the mode selecting unit 46 is the TC position when the start switch 43 is turned on, the vehicle body controller 15 is configured to start controlling the drivetrain 6 in the traction control mode. In other words, in starting of the vehicle, the vehicle body controller 15 is configured to start controlling the drivetrain 6 in the traction control mode. Therefore, even if the control mode was set to be the MAX mode when the start switch 43 was previously turned off, the control mode is configured to be set to be the traction control mode in turning on the start switch 43 next time.

Figure 13:
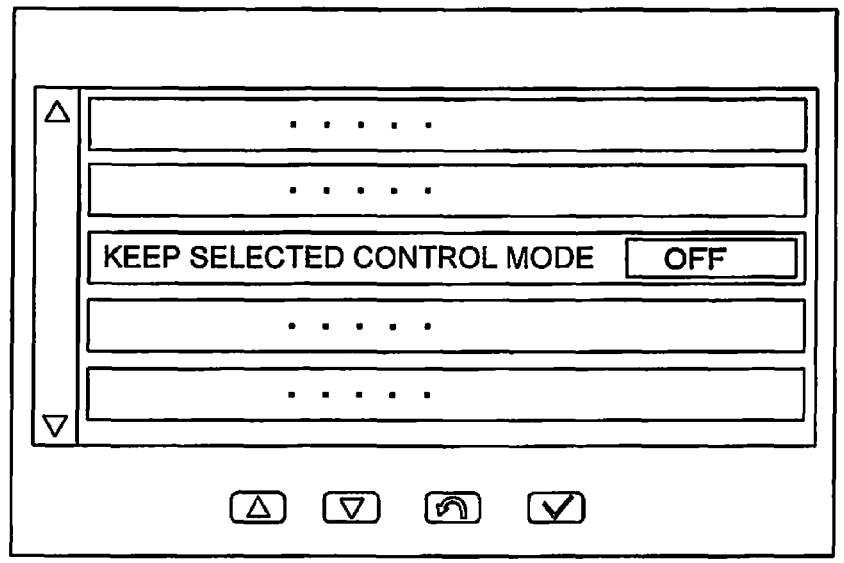
FIG. 13 is a diagram showing an operation screen of a mode keeping and setting unit.

It should be noted that the input device 47 includes a mode keeping and setting unit 53. The mode keeping and setting unit 53 is configured to set a given control mode selected by the mode selecting unit 46 to be kept in starting of the vehicle. FIG. 13 is an operation screen of the mode keeping and setting unit 53 configured to be displayed on the input device 47. On/off setting of the function of keeping a selected control mode is enabled by the mode keeping and setting unit 53. In a condition that the function of keeping a selected control mode is set to be off, even when the control mode was set to be the MAX mode when the start switch 43 was previously turned off, the control mode is configured to be set to be the traction control mode in turning on the start switch 43 next time.

In a condition that the function of keeping a selected control mode is set to be on, a given control mode set when the start switch 43 was previously turned off is configured to be kept. In other words, when the control mode was set to be the MAX mode when the start switch 43 was previously turned off, the control mode is configured to be set to be the MAX mode in turning on the start switch 43 next time. When the control mode was set to be the traction control mode when the start switch 43 was previously turned off, the control mode is configured to be set to be the traction control mode in turning on the start switch 43 next time. It should be noted that a given control mode, set when the start switch 43 was previously turned off, is stored in a predetermined one of the memories of the vehicle body controller 15.

After starting of the vehicle, the vehicle body controller 15 is configured to switch among the control modes in accordance with an operation signal from the mode selecting unit 46. In other words, the vehicle body controller 15 is configured to obtain the operation signal from the mode selecting unit 46 and control the drivetrain 6 in accordance with a given control mode selected by the mode selecting unit 46.

As shown in FIG. 7, when the mode selecting unit 46 is operated and switched to the MAX position in a condition that the control mode is set to be the traction control mode, the control mode is configured to be switched from the traction control mode to the MAX mode. As described above, the mode selecting unit 46 is configured to be automatically restored to the TC position after operated and switched to the MAX position. However, the control mode is configured to be kept set to be the MAX mode.

When the mode selecting unit 46 is operated and switched to the MAX position in a condition that the control mode is set to be the MAX mode, the control mode is configured to be switched from the MAX mode to the traction control mode. Thus, when the position selected by the mode selecting unit 46 is the TC position, the control mode is configured to be alternately switched between the traction control mode and the MAX mode every time the mode selecting unit 46 is operated and switched to the MAX position.

When the mode selecting unit 46 is operated and set to the S position from the TC position, the vehicle body controller 15 is configured to switch the control mode to the S mode. It should be noted that if the position selected by the mode selecting unit 46 was the S position when the start switch 43 was turned on, the vehicle body controller 15 is configured to start controlling the drivetrain 6 in the S mode. Then, when the mode selecting unit 46 is operated and set to the TC position from the S position after starting of the vehicle, the vehicle body controller 15 is configured to switch the control mode from the S mode to the traction control mode.

It should be noted that in the aforementioned explanation, the traction control mode is either the level selecting mode or the automatic mode. In other words, when the automatic mode is set by the TC setting unit 51, the automatic mode is configured to be performed as the traction control mode.

When the level selecting mode is set by the TC setting unit 51, the level selecting mode is configured to be performed as the traction control mode.

When the level selecting mode is set as the traction control mode, the function of keeping a selected control mode is disabled. In other words, if the control mode was set to be the level selecting mode when the start switch 43 was previously turned off, controlling of the drivetrain 6 is started in the level selecting mode in turning on the start switch 43 next time.

Figure 14:
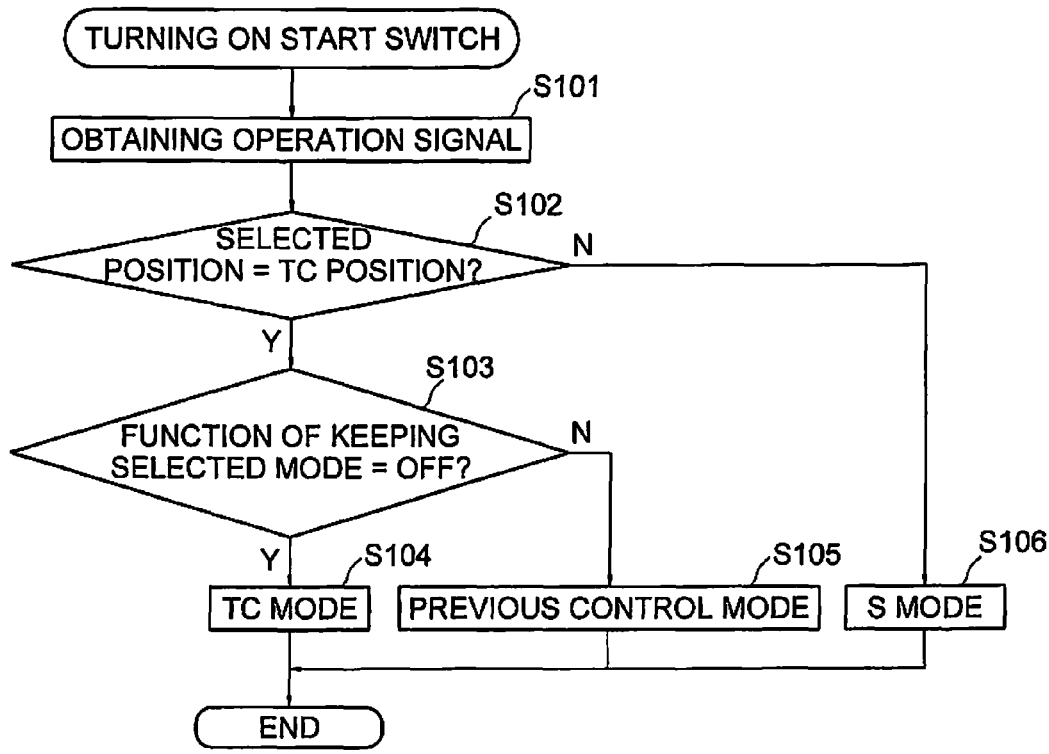
FIG. 14 is a flowchart showing a control mode switching processing to be performed in starting of the vehicle.

FIG. 14 is a flowchart showing a control mode switching processing to be performed in starting of the vehicle. In the following explanation, it is assumed that the automatic mode has been selected as the traction control mode.

As shown in FIG. 14, in Step S101, the vehicle body controller 15 obtains an operation signal from the mode selecting unit 46. In Step S102, the vehicle body controller 15 determines whether or not the position selected by the mode selecting unit 46 is the TC position. When the position selected by the mode selecting unit 46 is the TC position, the processing proceeds to Step S103.

In Step S103, the vehicle body controller 15 determines whether or not the function of keeping a selected control mode is set to be off. When the function of keeping a selected control mode is set to be off, the vehicle body controller 15 sets the control mode to be the traction control mode in Step S104.

When the function of keeping a selected control mode is set to be on in Step S103, the vehicle body controller 15 sets the control mode to be the one set when the vehicle was previously deactivated in Step S105. In other words, the vehicle body controller 15 sets the control mode to be the one set when the start switch 43 was turned off.

When the position selected by the mode selecting unit 46 is not the TC position in Step S102, in other words, when the position selected by the mode selecting unit 46 is the S position, the vehicle body controller 15 sets the control mode to be the S mode in Step S106.

Figure 15:
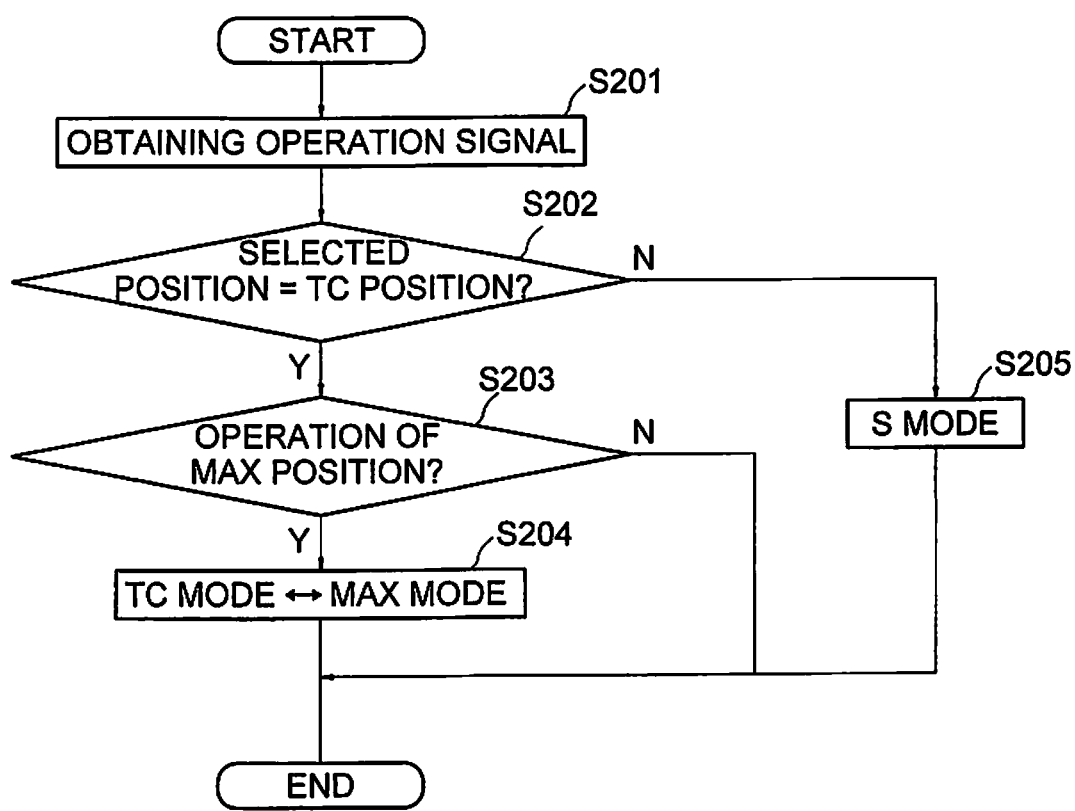
FIG. 15 is a flowchart showing a control mode switching processing to be performed after starting of the vehicle.

FIG. 15 is a flowchart showing a control mode switching processing to be performed after starting of the vehicle. It is herein assumed that controlling of the drivetrain 6 has been started in the traction control mode.

In Step S201, the vehicle body controller 15 obtains an operation signal from the mode selecting unit 46. In Step S202, the vehicle body controller 15 determines whether or not the position selected by the mode selecting unit 46 is the TC position. When the position selected by the mode selecting unit 46 is the TC position, the processing proceeds to Step S203.

In Step S203, the vehicle body controller 15 determines whether or not the mode selecting unit 46 has been operated and set to the MAX position. When the mode selecting unit 46 has been operated and set to the MAX position, mode switching is performed in Step S204. The control mode is herein alternately switched between the traction control mode and the MAX mode.

When the position selected by the mode selecting unit 46 is not the TC position in Step S202, in other words, when the position selected by the mode selecting unit 46 is the S position, the vehicle body controller 15 switches the control mode to the S mode in Step S205.

In the wheel loader 1 according to the present exemplary embodiment explained above, even when the control mode has been set to be the MAX mode, controlling of the drivetrain 6 is started in the traction control mode in next starting of the vehicle after deactivation of the vehicle. In other words, the traction control mode has been set as the default of the control mode in starting of the vehicle. Therefore, the drivetrain 6 can be controlled in the traction control mode exerting better fuel economy even when the operator does not operate the mode selecting unit 46 in starting of the vehicle. Accordingly, enhancement in fuel economy can be achieved.

When the operator does not want to set the fraction control mode as the default control mode, operation of the vehicle can be started in a given control mode set when the start switch 43 was previously turned off by setting the function of keeping a selected control mode to be on. Therefore, when the operator always wants to use the MAX mode, for instance, this is enabled by setting the function of keeping a selected control mode to be on. Accordingly, operation of the vehicle can be started in the MAX mode without operating the mode selecting unit 46 in starting of the vehicle.

In the automatic mode, the maximum traction force is regulated in accordance with work phases. Additionally, in performing a type of work requiring high power such as "scooping-up", the maximum traction force is automatically increased to the magnitude equivalent to that in the MAX mode. Accordingly, enhancement in fuel economy can be achieved in performing a type of work not requiring high power, whereas high power can be easily obtained in performing a type of work requiring high power.

One exemplary embodiment of the present invention has been explained above. However, the present invention is not limited to the aforementioned exemplary embodiment, and a variety of changes can be made without departing from the scope of the present invention.

Figure 16:
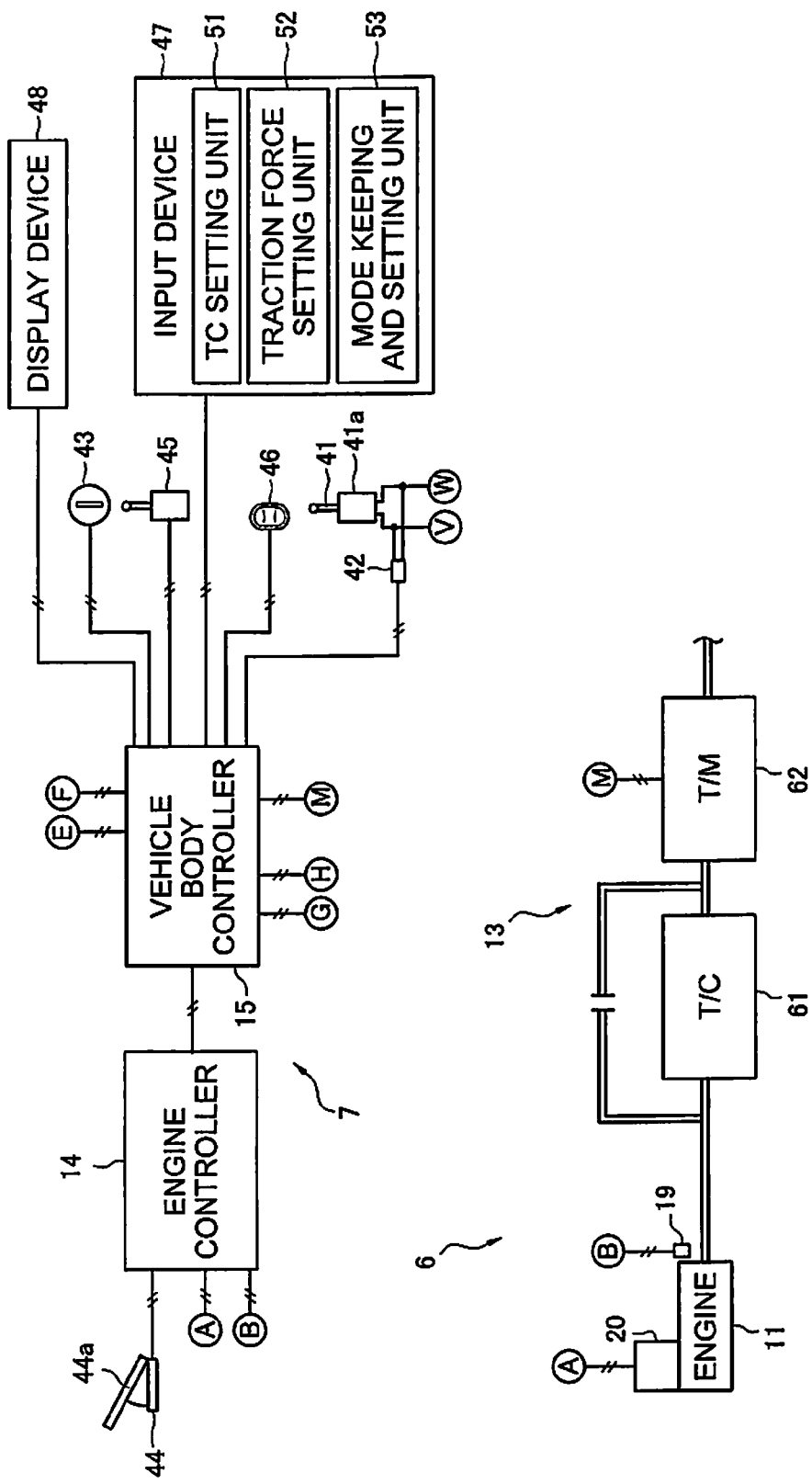
FIG. 16 is a schematic diagram showing a configuration of a drivetrain and a control system of a wheel loader according to another exemplary embodiment.

In the aforementioned exemplary embodiment, the HST has been taken as an example of the power transmission mechanism 13. However, the power transmission mechanism is not limited to the HST, and may be different from the HST. For example, as shown in FIG. 16, the power transmission mechanism 13 may include a torque converter 61 and a transmission 62 to transmit a driving force from the engine 11 to the travelling wheels 4. The transmission 62 may include a plurality of hydraulic clutches and a plurality of shift gears. The gear stage of the power transmission mechanism 13 may be configured to be controlled through controlling of the plural hydraulic clutches by the vehicle body controller 15. In this case, the maximum traction force may be regulated by controlling the engine 11. For example, the maximum traction force may be regulated by changing engine torque characteristics, controlling engine rotational speed, or controlling throttle maximum opening degree.

The construction of the HST is not limited to that of the aforementioned exemplary embodiment, and may be changed. For example, the HST may include two travelling motors.

In the aforementioned exemplary embodiment, the timing of starting the vehicle means the timing of turning on the start switch 43. However, the timing of starting the vehicle may be the timing of starting the engine 11. Alternatively, the timing of starting the vehicle may be the timing of starting up the control system 7 in the wheel loader 1.

Deactivation of the vehicle may mean that the start switch 43 remains turned off. Alternatively, deactivation of the vehicle may mean that the engine 11 remains stopped. Alternatively, deactivation of the vehicle may mean that the control system 7 of the wheel loader 1 remains shut down.

In the aforementioned exemplary embodiment, the MAX mode has been exemplified as the first mode, and the traction control mode has been exemplified as the second mode. However, the first mode and the second mode may not be limited to these control modes and may be changed. For example, the first mode may be a control mode in which the maximum traction force is smaller than the largest one of the maximum traction forces of all the control modes.

In the aforementioned exemplary embodiment, the S mode has been exemplified as the third mode. However, the third mode may be different from the S mode. Alternatively, the S mode may not be provided.

In the aforementioned exemplary embodiment, the traction control mode includes the automatic mode and the level selecting mode. However, the traction control mode may have only either of the automatic mode and the level selecting mode. The mode keeping and setting unit 53 may not be provided.

The construction of the mode selecting unit 46 is not limited to that of the aforementioned exemplary embodiment and may be changed. For example, the mode selecting unit 46 may be configured to function as an alternate action switch in the MAX position and the TC position. Alternatively, the mode selecting unit 46 may be implemented by a plurality of switches. For example, a switch switchable between the MAX position and the TC position and a switch switchable between on and off of the S position may be separately provided.

In starting of the vehicle, controlling the drivetrain in the second mode may not be started at exactly the same timing as starting of the vehicle, and may be started at a timing shifted from starting of the vehicle. For example, the control mode may be set to be the first mode immediately after starting of the vehicle, and may be switched into the second mode after elapse of a predetermined period of time.

Alternatively, controlling the drivetrain in the second mode in starting of the vehicle may be started at the timing that the vehicle starts travelling. Yet alternatively, controlling the drivetrain in the second mode in starting of the vehicle may be started at the timing that the work implement 3 is activated.

According to exemplary embodiments of the present invention, enhancement in fuel consumption can be achieved in a wheel loader.

The invention claimed is:
1. A wheel loader, comprising:
a travelling wheel;
a drivetrain including an engine, a power transmission mechanism and a work implement pump, the power transmission mechanism being configured to rotationally drive the travelling wheel by a driving force from the engine, the work implement pump being configured to be driven by the engine;
a work implement configured to be driven by a hydraulic oil discharged from the work implement pump;
a mode selecting unit configured to be operated by a user to generate an operation signal indicating one control mode selected from a plurality of control modes, the plurality of control modes including a predetermined first mode, a second mode in which a traction force is controlled to be smaller than in the first mode, and a third mode; and
a controller configured to
obtain the operation signal from the mode selecting unit and control the drivetrain in accordance with the selected control mode,
control the traction force to a maximum traction force in the second mode when a vehicle speed of the wheel loader is a predetermined first speed, control the traction force in the third mode to be smaller than the maximum traction force of the second mode when the vehicle speed is the predetermined first speed, initially start controlling the drivetrain in the second mode upon starting of the engine when the first mode is selected by the mode selecting unit, initially start controlling the drivetrain in the third mode upon starting of the engine when the third mode is selected by the mode selecting unit.

2. The wheel loader according to claim 1, wherein a maximum traction force in the first mode is the largest among maximum traction forces in all the control modes.

3. The wheel loader according to claim 1, wherein the controller is configured to determine a work phase of the wheel loader, and when the second mode is selected among the plurality of control modes, the controller is configured to control the maximum traction force in accordance with the determined work phase.

4. The wheel loader according to claim 1, further comprising a traction force setting unit configured to set a magnitude of the maximum traction force, when the second mode is selected among the control modes, the controller being configured to make the maximum traction force have the magnitude set by the traction force setting unit.

5. The wheel loader according to claim 1, further comprising a start switch for starting the engine, the controller being configured to start controlling the drivetrain in the second mode when the start switch is turned on.

6. The wheel loader according to claim 1, further comprising a mode keeping and setting unit configured to set the control mode last selected by the mode selecting unit to be kept upon starting of the engine.

7. The wheel loader according to claim 1, wherein the mode selecting unit is a switch switchable among a first position for selecting the first mode, a second position for selecting the second mode and a third position for selecting the third mode, the mode selecting unit being configured to be automatically restored to the second position from the first position, the mode selecting unit being configured to be selectively kept in either the second position or the third position.

8. The wheel loader according to claim 1, wherein the mode selecting unit is a switch switchable between a first position for selecting the first mode and a second position for selecting the second mode, the mode selecting unit being configured to be automatically restored to the second position from the first position.

9. The wheel loader according to claim 1, wherein the power transmission mechanism includes a travelling pump configured to be driven by the engine, and a hydraulic motor configured to be driven by the hydraulic oil discharged from the travelling pump and rotationally drive the travelling wheel.

10. The wheel loader according to claim 1, wherein the power transmission mechanism includes a torque converter and a transmission to transmit the driving force from the engine to the travelling wheel.

11. A wheel loader, comprising:

a travelling wheel;

a drivetrain including an engine, a power transmission mechanism and a work implement pump, the power transmission mechanism being configured to rotationally drive the travelling wheel by a driving force from the engine, the work implement pump being configured to be driven by the engine;

a work implement configured to be driven by a hydraulic oil discharged from the work implement pump;

a mode selecting unit configured to be operated by a user to generate an operation signal indicating one control mode selected from a plurality of control modes, the plurality of control modes including a first mode and a second mode; and a controller configured to obtain the operation signal from the mode selecting unit and control the drivetrain in accordance with the selected control mode, and initially start controlling the drivetrain in the second mode upon starting of the engine, a traction force of the wheel loader being smaller in the second mode than in the first mode when a vehicle speed of the wheel loader less than a predetermined vehicle speed, and the traction force being the same in the second mode as in the first mode when the vehicle speed is the predetermined vehicle speed or greater.

12. A method of controlling a wheel loader, comprising the steps of:

obtaining an operation signal from a manually operated mode selecting unit indicating one control mode selected from a plurality of control modes including a predetermined first mode, a second mode in which a traction force of the wheel loader is controlled to be equal to or smaller than in the first mode, and a third mode;

controlling a drivetrain in accordance with the selected control mode;

initially starting control of the drivetrain in the second mode upon starting of the engine when the first mode is selected;

initially starting control of the drivetrain in the third mode upon starting of the engine when the third mode is selected;

controlling the traction force to a maximum traction force in the second mode when a vehicle speed of the wheel loader is a predetermined first speed, controlling the traction force in the third mode to be smaller than the maximum traction force of the second mode when the vehicle speed is the predetermined first speed.

* * * * *